(12) United States Patent
Kadyk et al.

(10) Patent No.: US 7,293,046 B2
(45) Date of Patent: *Nov. 6, 2007

(54) ACCOUNTING FOR UPDATE NOTIFICATIONS IN SYNCHRONIZING DATA THAT MAY BE REPRESENTED BY DIFFERENT DATA STRUCTURES

(75) Inventors: Donald J. Kadyk, Bothell, WA (US); Neil S. Fishman, Bothell, WA (US); Marc E. Seinfeld, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 411 days.

This patent is subject to a terminal disclaimer.

(21) Appl. No.: 11/021,537

(22) Filed: Dec. 23, 2004

(65) Prior Publication Data
US 2005/0144312 A1    Jun. 30, 2005

Related U.S. Application Data

(63) Continuation of application No. 09/768,747, filed on Jan. 24, 2001, now Pat. No. 6,941,326.

(51) Int. Cl.
*G06F 17/30* (2006.01)
(52) U.S. Cl. ............... 707/203; 707/202; 707/204
(58) Field of Classification Search ........... 707/200, 707/202, 203
See application file for complete search history.

(56) References Cited

U.S. PATENT DOCUMENTS 6,108,655 A * 8/2000 Schleimer et al. ............ 707/10
6,477,545 B1 * 11/2002 LaRue .................... 707/201
6,611,535 B2 * 8/2003 Ljungqvist ............... 370/477
6,810,405 B1 * 10/2004 LaRue et al. ............. 707/201

OTHER PUBLICATIONS

Chan et al. TCP (transimssion control protocol) over wireless links, Vehicular Technology Conference, 1996 IEEE 47th, vol. 3, p. 1326-1330, May 4-7, 1997.*

(Continued)

*Primary Examiner*—John Breene
*Assistant Examiner*—Baoquoc N. To
(74) *Attorney, Agent, or Firm*—Workman Nydegger

(57) ABSTRACT

Methods, systems, and computer program products for synchronizing data stored at one or more message clients with data stored at a message server where the message clients may receive update notifications and may represent the data using different data structures than the message server uses to represent the same data. A token is associated with each data change that occurs at the message server. The message server sends each change and associated token to the message clients. When the message clients request a synchronization, the tokens they received are returned to the message server for comparison with the tokens the message server sent to the message clients. If the message clients do not return a particular token, the message server determines that the clients did not receive the corresponding change and resends the change to the message clients. Tokens may also be used to divide a change into one or more portions, with only one portion being provided initially. Then, in response to receiving the token associated with the portion, the message server may provide the remaining portion of the message to the message clients.

14 Claims, 6 Drawing Sheets

OTHER PUBLICATIONS

Venkata Ramana et al. Learning-TCP: a novel learning automata based reliable transport protocol for ad hoc wireless networks, Broadband Networks, 2005 2nd International Conference, vol. 1, p. 484-493, Oct. 3-7, 2005.*

Kliazovich et al. DAWL: a delayed-ACK scheme for MAC-level perfomance enhancement of wireless LANs, Mobile Networks and Applications, vol. 10, Issue 5, pp. 607-615, 2005.*

* cited by examiner

ACCOUNTING FOR UPDATE NOTIFICATIONS IN SYNCHRONIZING DATA THAT MAY BE REPRESENTED BY DIFFERENT DATA STRUCTURES

CROSS-REFERENCE TO RELATED APPLICATIONS

The present application is a continuation application of commonly-assigned U.S. patent application Ser. No. 09/768, 747 filed Jan. 24, 2001, now U.S. Pat. No. 6,941,326 entitled "Accounting for Update Notifications in Synchronizing data that may be Represented by Different Data Structures" and which is incorporated herein by reference.

BACKGROUND OF THE INVENTION

1. The Field of the Invention

The present invention relates to synchronizing data. Specifically, the present invention relates to methods, systems, and computer program products for synchronizing data stored at one or more message clients with data stored at a message server, where the clients may receive update notifications and may represent the data using different data structures than the message server uses to represent the same data.

2. Background and Relevant Art

There are a variety of circumstances where it is desirable to maintain the same data in different locations. Synchronizing data is the process of reflecting in one copy of the data, changes that are made in another. Depending on the needs of a particular application, synchronization may be almost instantaneous or may be relatively sporadic. During the time that elapses between data synchronizations, a copy of data that has not been updated is termed "stale."

One increasingly popular application for maintaining two copies of the same data is the use of personal digital assistants ("PDAs"). PDAs store various types of information, including task, calendar, contact, email, music, map, financial, and sports data. In short, PDAs may store virtually any type of electronic information. The compact size of PDAs allows a user the convenience of having access to a large amount of information without the bulk of a portable computer or paper organizer. In many cases, a host computer provides centralized data storage for a PDA, with the PDA and host computer each storing separate copies of the data.

Note that in this description and in the claims, a second device containing a "copy" of the data on a first device means that the second device represents the current state of the data insofar as the second device is capable of representing, or chooses to represent, the data stored on the first device, given the hardware and software capabilities of the second device. For example, data formats, representations, and supported fields may vary from one device to another due to corresponding differences in application software, operating systems, available memory, processor type, etc. One reason that such differences exist, and are likely to continue, is a lack of standardization. Nevertheless, for purposes of this description, the second device has a "copy" of the data on the first device if the second device represents the current state of the data insofar as the second device is either capable or chooses, considering the hardware and software differences that may exist between the devices.

The host's centralized storage offers a number of benefits. For example, it allows several users to share task, calendar, and contact data and the host may act as a primary location for receiving email. However, the PDA and host do not maintain an open channel of communication in typical operation. As a result, the data stored at either the host or PDA becomes stale because changes made in one device cannot be reflected in the other. Therefore, the host and PDA data must be updated periodically to insure that each device contains current information.

There are two basic types of data updates: demand synchronization and update notification. A demand synchronization is an explicit request to synchronize data. Generally, a demand synchronization is characterized by two-way communication between the synchronizing devices. During a demand synchronization, the devices exchange any modified data. The synchronization is complete once the devices confirm to each other that they have received all modifications and contain the same data insofar as the devices are capable of representing, or choose to represent, the data.

In contrast, update notifications are one-way communications that simply inform another device of data changes as they occur. Because they involve one-way communications, update notifications may be carried out over an unreliable communication channel, whereas demand synchronizations commonly are performed over a reliable communication channel. (In general, an unreliable communication channel does not include a destination acknowledging the receipt of data, whereas a reliable channel includes an acknowledgement.)

Demand synchronization usually includes the following operations. Both the host and the PDA track changes in their data that have occurred since the previous synchronization. Then, at the time of synchronization, only the tracked changes are exchanged between the host and PDA. If the same data has been changed in both devices, the synchronization recognizes a potential conflict and prompts the user to determine which change should be retained. In the absence of a conflict, changes are applied automatically, without prompting the user. Any changes made during the demand synchronization process are tracked as synchronization changes so that these changes will not be exchanged during a subsequent demand synchronization. Otherwise, a PDA receiving a changed phone number from a host would reflect the changed phone number back to the host during the next synchronization, even though the PDA made no change to the phone number, other than to make it consistent with the phone number stored at the host.

Resolving conflicts without user intervention requires relatively sophisticated processing and as a rule the user is prompted for all but the most trivial cases. One reason why it may be difficult to resolve conflicts automatically is that, as mentioned above, a PDA may represent, format, or store information differently from how the corresponding information is stored at the host. As a result, even data that is the "same" may contain different information.

One area of recent advancement in PDA technology involves more frequently updating a PDA through update notification in order to reduce data staleness. Previously, PDAs had included only cable or infrared links for communicating with a host, requiring the two devices to be in relatively close proximity for even demand synchronization. Terrestrial airwave receivers have been added to some newer PDA models in order to increase the range at which they can receive new or changed data from a host. The increased range allows for both update notification and demand synchronization to occur while a PDA is located a substantial distance from a host.

Transmitting over substantial distances introduces some uncertainty as to whether or not a PDA will receive an update notification. For example, the PDA may travel beyond the transmission area and thus never receive the update notification. Since the communication links for update notification may be unreliable (in contrast to the reliable links commonly used in demand synchronization), the host remains ignorant of the unsuccessful receipt of the update notification. Thus, the host does not know to take any corrective action such as resending the update notification.

After processing an update notification, it may seem as if both devices have independently made a change since the same change may appear different depending on how the devices store the data. Thus, during a subsequent demand synchronization, the apparent conflict is likely to require user intervention to resolve. A user must compare the PDA and host data and confirm that they in fact represent the same data. Alternatively, demand synchronization may not be able to determine whether or not a particular change was received and, as a result, send a duplicate of an earlier change. For example, a new contact may be added once by an update notification and a second time by a demand synchronization. Resolving duplicate changes also requires user intervention. However, requiring user intervention substantially erodes the benefits offered by update notification. It can be frustrating and inordinately time-consuming for a user to make even a few comparisons or reconcile a few duplicate records.

As illustrated by the preceding examples, a need exists for synchronizing efficiently when update notifications may be received and when synchronizing between devices that represent the same data using different data structures. Therefore, methods, systems, and computer program products are desired that allow for the benefits of update notifications and account for differences is how information is stored, without imposing substantial burdens on the user.

BRIEF SUMMARY OF THE INVENTION

These and other problems are overcome by the present invention, which is directed toward synchronizing copies of data stored at two separate devices by insuring that (i) demand synchronization does not duplicate changes received through update notification; (ii) demand synchronization provides a change if an update notification is not received or includes only a portion of the change; and (iii) changes may be identified regardless how a particular device stores data. As noted earlier, data updates may include demand synchronization (an explicit request to synchronize data, generally characterized by two-way communication where devices confirm that they contain the same data) and update notification (an informing of data changes as they occur, typically involving one-way communication). When used in the remainder of this application, "synchronization" and "update" should be read as a generic terms that may include either or both demand synchronization and update notification.

Furthermore, regardless of any earlier association between demand synchronization and reliable communication channels and any earlier association between update notification and unreliable communication channels, no particular communication channel necessarily should be imputed to the present invention unless so required by the claims. (As noted above, an unreliable communication channel refers to a channel that does not include an acknowledgement from a destination receiving data. For example, a radio or television transmitter does not require radios and televisions to confirm that they are receiving a transmission. In contrast, reliable channels include an acknowledgement. Many telephone and computer communication channels presume that data is lost if no acknowledgement is received and retransmit the lost data.)

The present invention associates tokens with stored data so as to reconcile changes that occur in separate "copies" of the same data. As mentioned above, a second device has a "copy" of the data on a first device if the second device represents the current state of the data insofar as the second device is able or chooses. This means that the copy may not be an identical replica of the original data.

The tokens serve at least two purposes: (1) they identify specific data, and (2) they identify a particular version of the specific data. Consider, for example, an individual data object in a contact database. As changes to the data object occur, a series of tokens may be generated, one for each version of or update to the data object. While all of the tokens in the series identify the same data object, each individual token identifies a different version of the data object. (That is, the data identifying part of each token is the same, but the data version part of each token is different.) If these changes are synchronized over an unreliable communication channel, it may appear as if separate changes have been made to each copy of the data, since different devices may represent the same data using different data structures. However, by reference to the tokens identifying the changes in question, determining whether two apparently distinct changes are in fact the same change is greatly simplified, especially in systems where different devices represent the same data using different data structures.

Initially, a sending device and a receiving device contain the "same" data. In other words, the receiving device represents the current state of the data insofar as it is able or chooses. At a subsequent time, the data stored in the sending device is modified in some way and the sending device creates a token that uniquely identifies the change. The token is unique to the sending device. Once the token has been created, the sending device generates a notification that includes both the change and corresponding token. This notification is sent to the receiving device in order to synchronize the data stored at the receiving device with the data stored at the sending device. (The sent token may be compressed to reduce its size. Although the compressed token may no longer be unique to the sending device, it is unique to the receiving device.)

Eventually, the receiving device requests demand synchronization to insure that it has received all changes that have occurred at the sending device. To perform this check, the receiving device returns a starting token and all the tokens it has received to the sending device. (If the tokens were compressed, they must be decompressed.) The sending device then compares the returned tokens with the tokens the sending device sent. Any tokens after the starting token that have not been returned by the receiving device indicate that the receiving device did not receive the change associated with the missing token. In response to a missing token, the sending device resends the change. Also, any new tokens provided by the receiving device indicate changes to data on the receiving device that should be delivered to the sending device.

Tokens also may be used to divide a change into various portions. For example, an email may be divided into a header portion, a body portion, and an attachment portion. Initially, a sending device may send a notification that corresponds to the header portion. This allows the receiving device to display a representative amount of the message, such as who originated the message, the subject line, etc., without having to receive the full message. Then, in response to receiving the token corresponding to the header portion, the sending device may send the remaining portions of the email message. A missing header token would result in the sending device sending the full email message.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
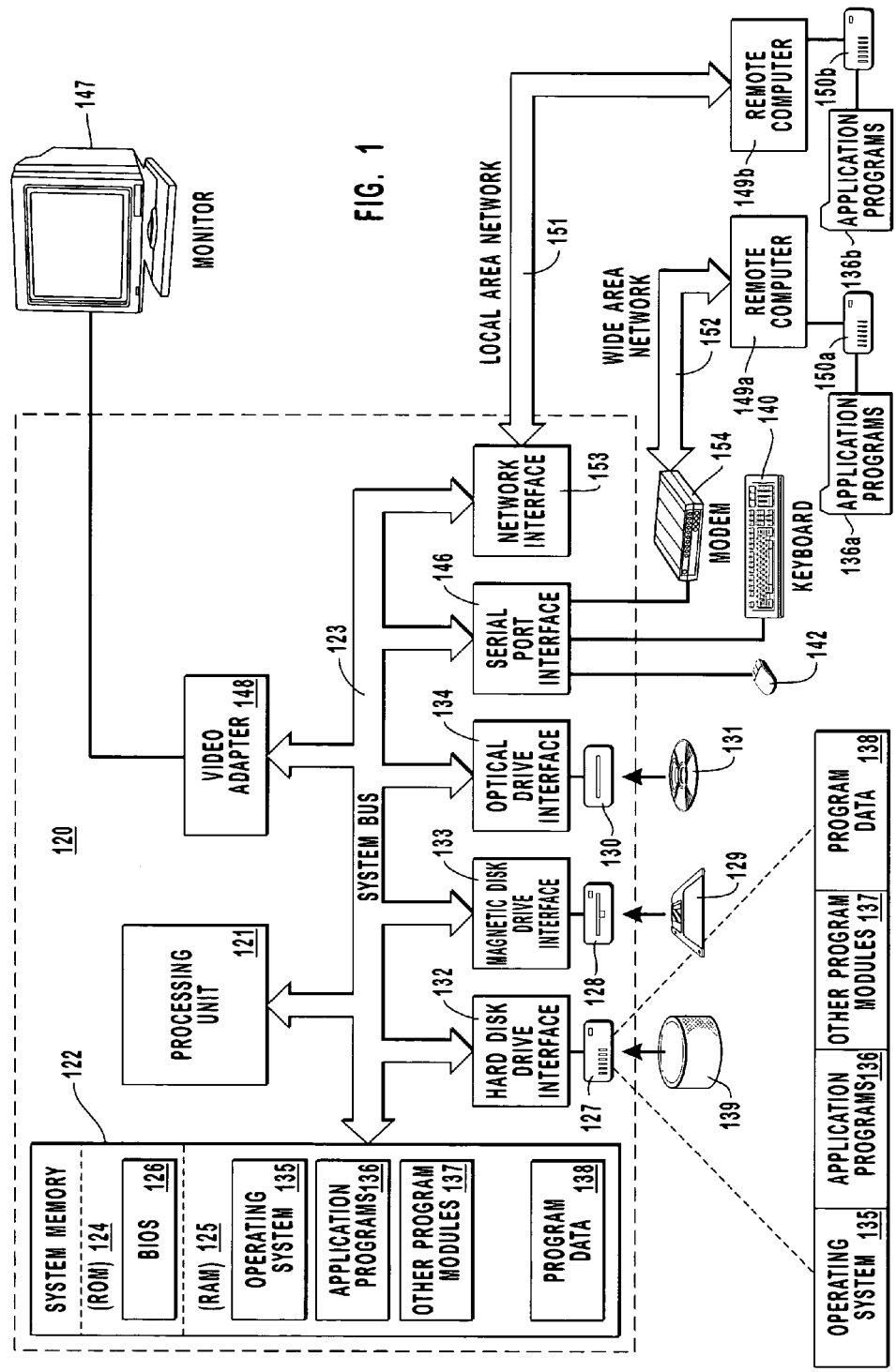
FIG. 1 illustrates an exemplary system that provides a suitable operating environment for the present invention.

The invention is described below by using diagrams to illustrate either the structure or processing of embodiments used to implement the systems, methods, and computer program products of the present invention. Using the diagrams in this manner to present the invention should not be construed as limiting of its scope. The present invention extends to methods, systems, and computer program products for synchronizing data stored at one or more message clients with data stored at a message server.

As used in the application, a message server is a device or combination of devices that originates changes to data and a message client is one or more devices that receive the originated changes from the message server. The same device may operate, therefore, as either a message server or a message client, depending on how it interacts with other devices. It should also be recognized that references to copies of the "same" data includes copies containing of only a subset of the data in question. In other words, one copy may include only selected fields from another copy and still be considered to store the "same" data.

Those of skill in the art will recognize that the principles of the present invention allow for efficient demand synchronization when a message client may receive update notifications from a message server, as noted in the following and other considerations. First, update notifications that the message client receives are communicated with demand synchronization requests so that demand synchronization does not duplicate the changes the message client received through update notification. Second, demand synchronization provides a change if an update notification is not received or if an update notification includes only a portion of the change. For example, an update notification may include only certain portions of an email message, such as a subject line, the sender, etc. Demand synchronization provides other portions that were not included in the update notification. Third, changes may be identified regardless how a particular device stores data. In many cases, data formats, representations, and supported fields vary from one device to another, based on corresponding differences in application software, operating systems, available memory, processor type, etc.

The message server associates a token with changes that are made to the data stored at the server. Note that the term "change" should be interpreted broadly to include a modification to existing data as well as the addition of new data. A token identifies both the data that was changed (e.g., the specific data object that was modified) and the revision of the data that the change represents. The tokens and changes are combined to form notifications that are sent to the message clients. Tokens may be compressed to conserve storage space, but the tokens should be unique to each message client if not unique to the message server.

When clients request synchronization with the message server, the clients return all the tokens that have been received from the message server. Upon receiving the returned tokens, the message server compares the tokens returned by the clients with the tokens that were sent to the clients. The message server interprets a clients' failure to return a particular token as an indication that the token and corresponding change were never received by the client. In response, the message server resends the change to the client.

Tokens also may be used to subdivide a change. Only part of the change is included within the notification sent to the clients. The message server then interprets a client returning a token as an indication that the client would like to receive the remainder of the change. If the token is not returned, the server sends the full change.

Embodiments within the scope of the present invention include computer-readable media for carrying or having computer-executable instructions or data structures stored thereon. Such computer-readable media can be any available media which can be accessed by a general purpose or special purpose computer. By way of example, and not limitation, such computer-readable media can comprise physical storage mediums such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Such a medium may include a wireless carrier signal, for example. When information is transferred or provided over a network or another communications connection (either hardwired, wireless or a combination of hardwired and wireless) to a computer, the computer properly views the connection as a computer-readable medium. Thus, any such connection is properly termed a computer-readable medium. Combinations of the above also should be included within the scope of computer-readable media. Computer-executable instructions comprise, for example, instructions and data which cause a general purpose computer, special purpose computer, or special purpose processing device to perform a certain function or group of functions.

FIG. 1 and the following discussion are intended to provide a brief, general description of a suitable computing environment in which the invention may be implemented. Although not required, the invention may be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination or hardwired and wireless links) through a communications network. In a distributed computing environment, program modules may be located in both local and remote memory storage devices.

FIG. 1 illustrates a conventional computer 120 that includes components and data processing capabilities that may be used to implement embodiments of the invention. Computer 120 is a general purpose computing device that includes a processing unit 121, a system memory 122, and a system bus 123 that couples various system components including the system memory 122 to the processing unit 121. Processing unit 121 executing computer-executable instructions is one example of processing means for performing steps and acts according to the present invention. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joystick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically includes many or all of the elements described above relative to the computer 120, although only memory storage devices 150a and 150b an their association application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include, for example, a modem 154 or a wireless link. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means for establishing communications over wide area network 152 may be used.

Figure 2:
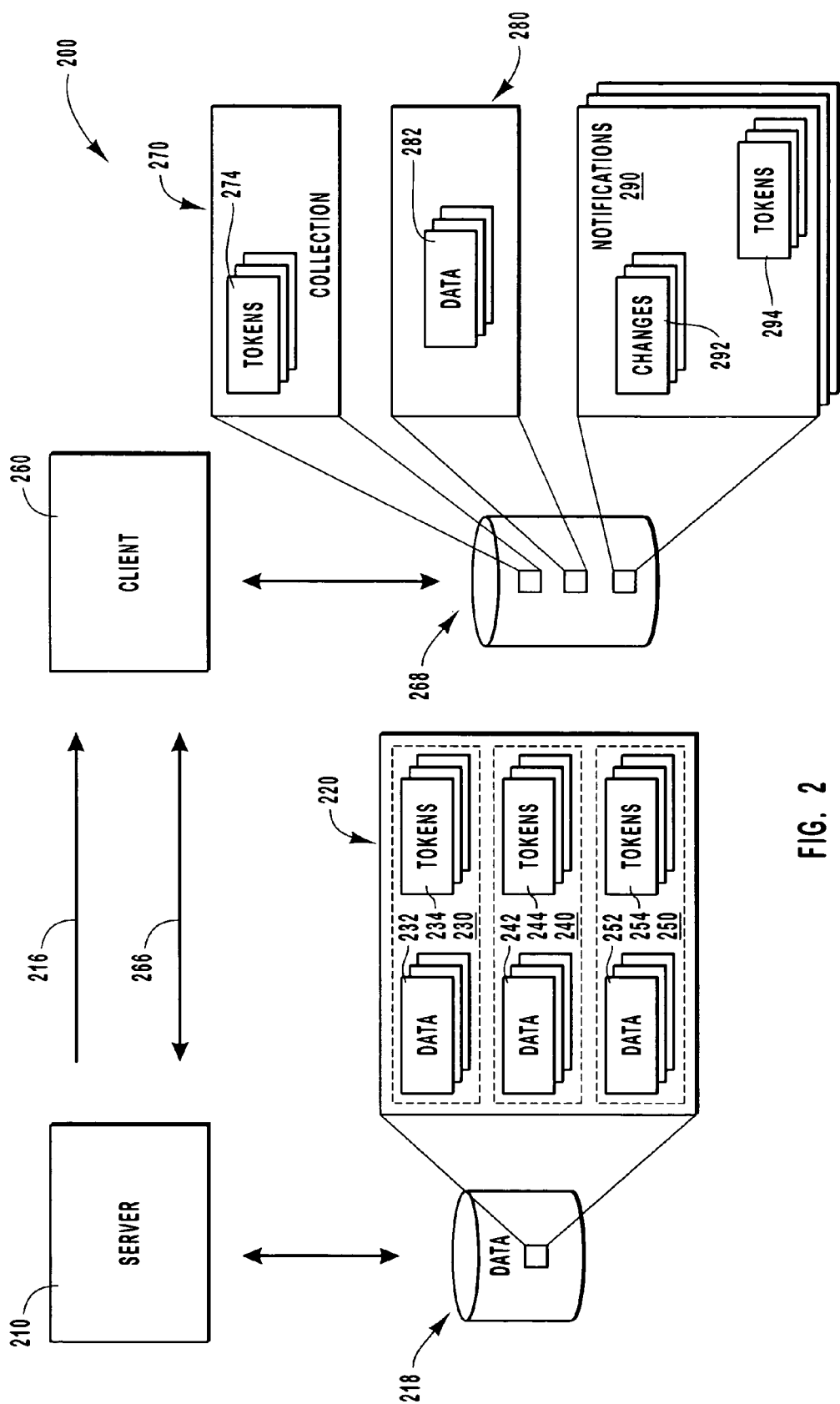
FIG. 2 is block diagram showing data structures and communication channels for synchronizing client data with server data.

FIG. 2 is block diagram showing data structures and communication channels for synchronizing storage 268 of client 260 with storage 218 of server 210. Enlarged portion 220 of storage 218 shows that storage 218 includes data type 230, data type 240, and data type 250. Data types are generic representations of information that may be stored in storage 218. For example, data types may correspond to general types of information such as task, contact, calendar, email, music, financial, and sports data, or data types may correspond to separate fields within data objects of a database. Data 232, data 242, and data 252 are provided to indicate that data types may be further subdivided. If data type 230 were task data, then data 232 might correspond to individual task objects. The present invention does not impose any particular requirements on what data types 230, 240, and 250 or data 232, data 242, and data 252 represent, the data and data types merely indicate that many types of information may be present at storage 218 in a wide variety of formats.

Client 260 and server 210 communicate over communication channels 216 and 266. Communication channel 216 includes an arrow that only points to client 260 as an indication of one-way communication from server 210 to client 260. In contrast, communication channel 266 includes arrows at both ends to indicate two-way communication between server 210 and client 260. One embodiment of the present invention implements communication channel 216 as an unreliable communication channel and communication channel 266 as a reliable communication channel.

Initially, storage 218 of server 210 and storage 268 of client 260 store identical copies of the same data. Recall that for purposes of this description and in the claims, a first device has a "copy" of the data stored at a second device if the first device represents the current data insofar as the first device is able or chooses. For example, a Personal Digital Assistant (PDA) may have limited memory and processing capability or may represent and format data differently based on the PDA's application software or operating system. Therefore, the PDA may store an abbreviated copy of data stored on a host computer in which memory and processing power is not so much a concern. Nevertheless, the PDA would store an identical copy of the data stored at the host computer if the PDA represents the current state of the data insofar as the PDA is capable or chooses. For example, a PDA may list a contact data object as including a name and a phone number while the host computer may list this and numerous other data fields for the same contact. So long as the name and phone number are current at the PDA, the PDA has an identical copy of the data.

It should be noted that enlarged portion 280 of storage 268 shows only data 282. This indicates that storage 268 may store only a subset of the data at storage 218. For simplicity, assume that data 282 corresponds to data 242 of storage 218. (The choice is arbitrary. Data 282 could correspond to data 232, data 242, and/or data 252. Furthermore, the present invention does not limit data 282 as corresponding to data located at a single server.) As changes are made to data 242, tokens 244 are created to identify the changes. The server 210 maintains an association between tokens 244 and data 242, such that when given a token 244, the server is able to identify the data 242 that corresponds to the token. Each of tokens 244 corresponds to a specific part of data 242.

To synchronize data 282 with data 242, server 210 creates update notifications. Each notification contains at least one of the changes and at least one of the corresponding tokens. As changes occur, the notifications are sent to client 260 over communication channel 216. In one embodiment, communication channel 216 is a wireless communication channel and notifications are transmitted to client 260. Client 260 stores the notifications it receives as notifications 290. Notifications 290 include changes 292 and tokens 294. In one embodiment, tokens 294 are compressed versions of tokens 244. Tokens 294 are unique to client 260 and tokens 244 are unique to server 210 (as are tokens 234 and tokens 254). Changes 292 correspond to the changes that are made to data 242, however it is possible that client 260 will not receive all notifications sent by server 210 and therefore changes 292 may be only a subset of those changes made to data 242.

Client 260 also stores collection 270. Collection 270 represents the state of the copy of data stored at client 260 during a previous synchronization when data 282 reflected all of the changes that had been made to data 242. Along with collection 270, a token may be stored to indicate the starting point for the next synchronization. Unlike the association between tokens 244 and data 242 at server 210, however, the tokens 274 at client 260 are not directly associated with data 282. The reason for this is that collection 270 represents an earlier state of the data, whereas data 282 is the current state of the data. In one embodiment of the present invention, collection 270 is compressed.

At some point in time, client 260 issues a synchronization request to server 210 through communication channel 266. Server 210 receives tokens 294, a starting point, and collection 270 with tokens 274 back from client 260. The tokens 294 and tokens 274 received back from client 260 are then compared to the tokens 244 that server 210 had sent to client 260. Server 210 interprets any of tokens 244 after the starting point that do not have matching tokens 294 or tokens 274 as an indication that client 260 did not receive the changes corresponding to the missing tokens.

In response, server 210 sends a new collection (not shown) and a list of tokens (not shown) identifying the changes that client 260 is missing. Client 260 then uses the list to request the missing changes from server 210. The missing changes are sent in the form of notifications. Once it has received the new collection and all of the missing changes, client 260 discards notifications 290 because the new collection contains all of the tokens necessary to represent the current state of data 282. Communication channel 266 is closed after client 260 has received its requested synchronization and server 210 starts the process over again by sending subsequent notifications to client 260 through communication channel 216.

Alternatively, if client 260 is unable to retrieve all of the missing changes, collection 270 and notifications 290 (including any notifications for missing changes that were received) are retained and the new collection is discarded. At the next synchronization opportunity, client 260 passes back collection 270 with tokens 274 and tokens 294 (including missing notifications and new notifications subsequently received from server 210). Server 210 performs the token comparison and the synchronization proceeds as described above. As a result, interrupting synchronization presents only a minor inconvenience.

It should be emphasized that the foregoing is only one example of how synchronization may occur. The present invention, as described in the appended claims, allows for many variations and therefore, this example should not be construed as imposing any additional limitations.

Figure 3A:
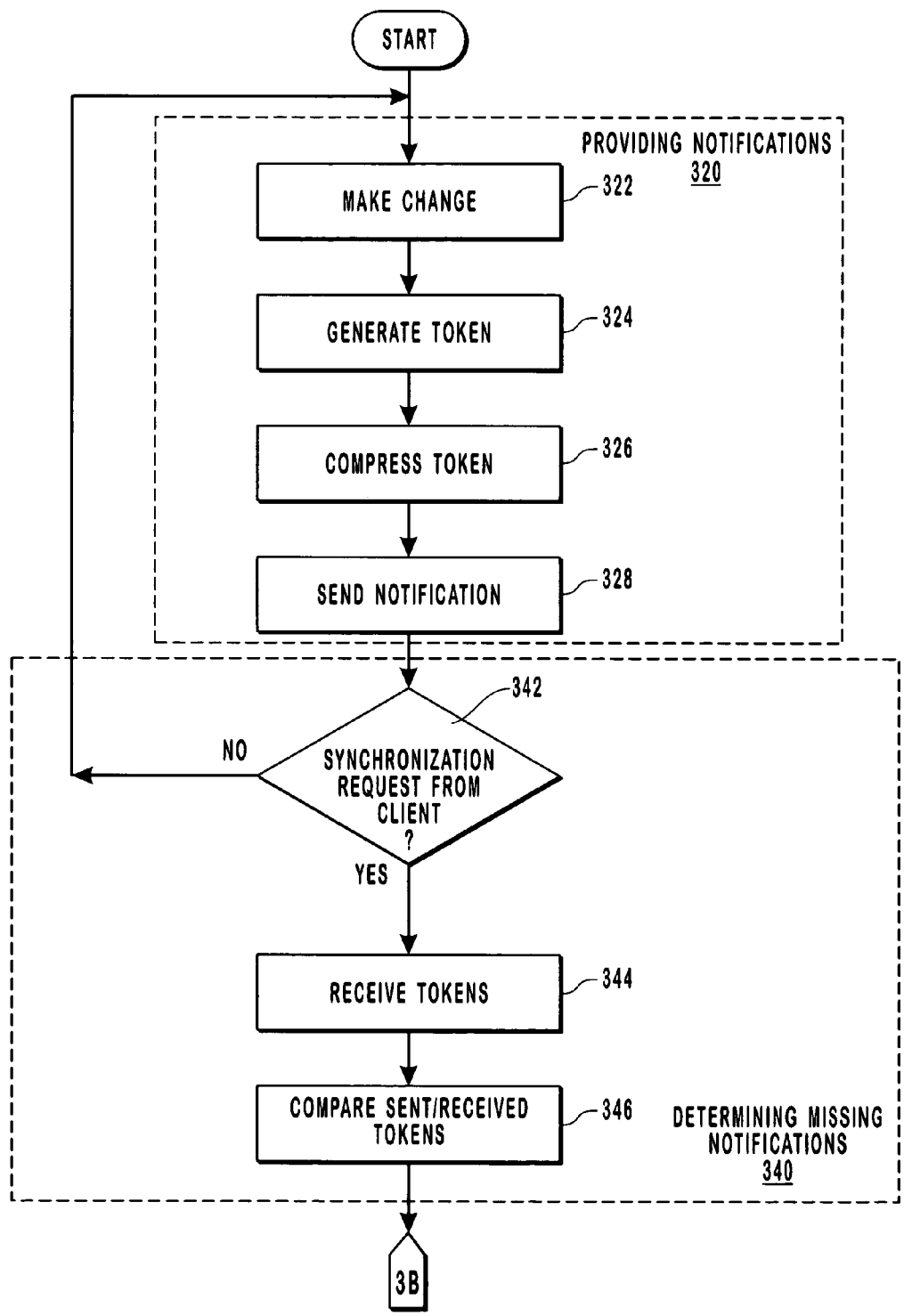
FIGS. 3A and 3B depict a server perspective flow chart of a method for synchronizing two copies of the same data.

Methods of the present invention from the perspective of the server will be described next with reference to the flow chart depicted in FIGS. 3A and 3B. Synchronization begins with the step of a server computer providing notifications (320). The step of providing notification comprises the acts of making a change (322) to the data stored at the server computer, generating a token (324) that corresponds to the change made, compressing the token (326) to reduce its size, and sending a notification (328) to the client computer.

Ordinarily, tokens will be unique to the server that generates them. However, in some circumstances it may be desirable to reduce a token's size. For example, wireless communication protocols may limit the amount of data sent in individual packets to approximately one hundred bytes. Large tokens needed to represent uniquely all changes made at the server, may require an inordinate proportion of the wireless payload. One solution is to compress the tokens so that they are unique to individual clients rather than unique to the server and thereby conserve bandwidth. Usually, only tokens sent to the client are compressed, whereas any tokens retained by the server to identify the version of data that the server stores remain uncompressed and unique to the server.

The step of determining missing notifications 340 follows. Decision block 342 performs the act of indicating whether the server has received a synchronization request from the client. If so, the server performs the act of receiving tokens (344) back from the client and the act of comparing the tokens received with the tokens sent to the client (346). In the absence of a synchronization request at decision block 342, processing returns to the beginning of step 320, providing notifications.

Figure 3B:
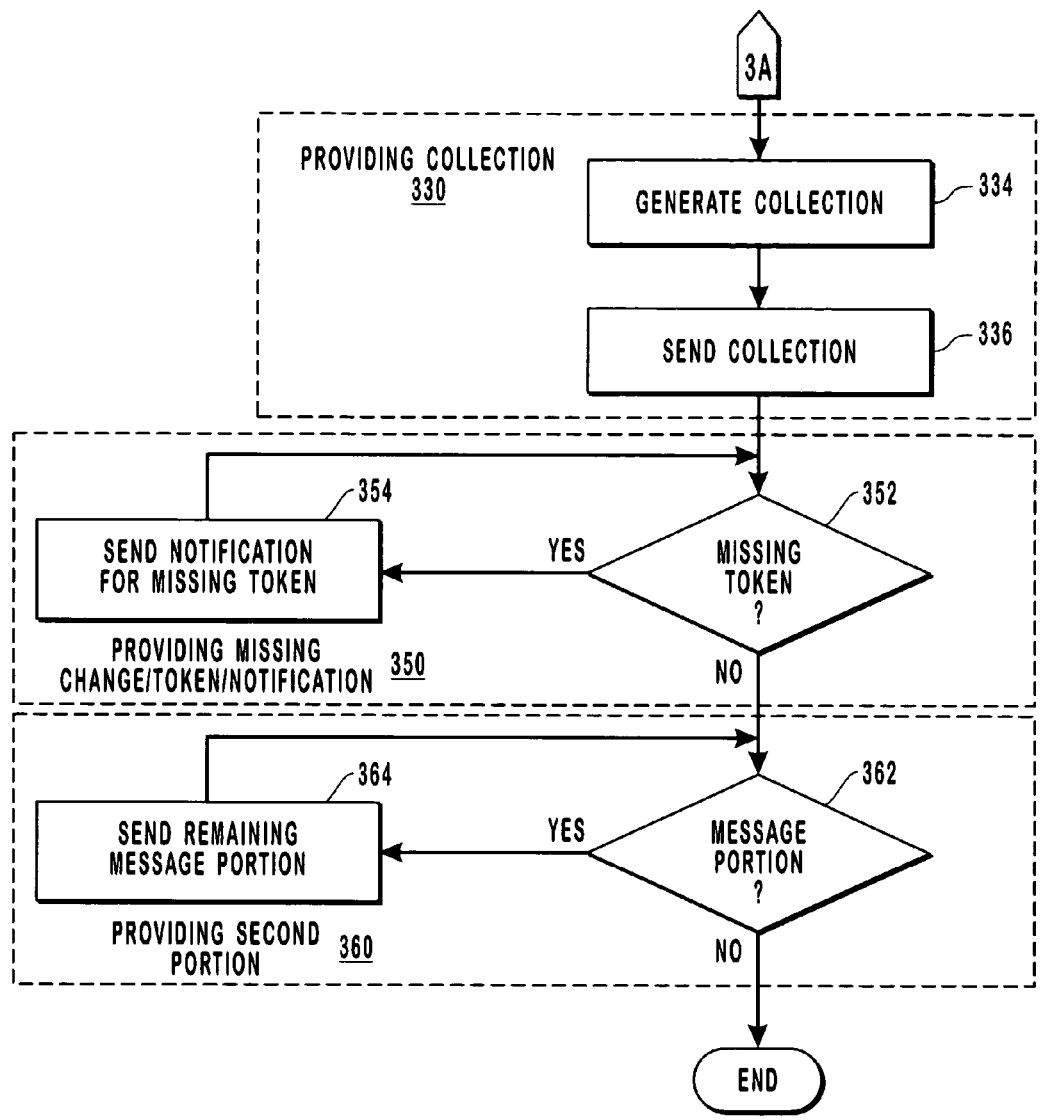

Turning next to FIG. 3B, the acts for providing a collection 330 are shown. A collection contains the tokens necessary to represent what the state of the client data should be after synchronizing has been completed. The collection is generated (334) at the server and sent to the client (336). The server also sends a list of tokens identifying the changes that client is missing based on a starting point provided by the client (not shown). Using this list, the client requests changes that it has not received.

After completing the step of providing a collection 330, the server begins the step of providing missing notifications 350 so that the client will have any changes that were not received. Providing missing notifications 350 comprises the acts of sending the missing notification 354 for each missing token identified (352). Note that step 350 allows for providing the change, token, and/or notification, etc. for a missing token.

The step of providing a second portion 360 relates to changes that the server divides into separate parts. For example, an email message may be divided into header, body, and attachment parts. Associating a change and token with the header allow for sending only a part of the message to the client. This approach may be attractive where the communication channel between the server and client has a relatively low bandwidth or is unreliable. By sending only the header, the client may display some portion of the email to a user as an indication that the server has received the complete email. Providing second portion 360 performs the acts of determining if a token identifies a message portion (decision block 362) and sending any remaining message portion (364) to the client.

Figure 4A:
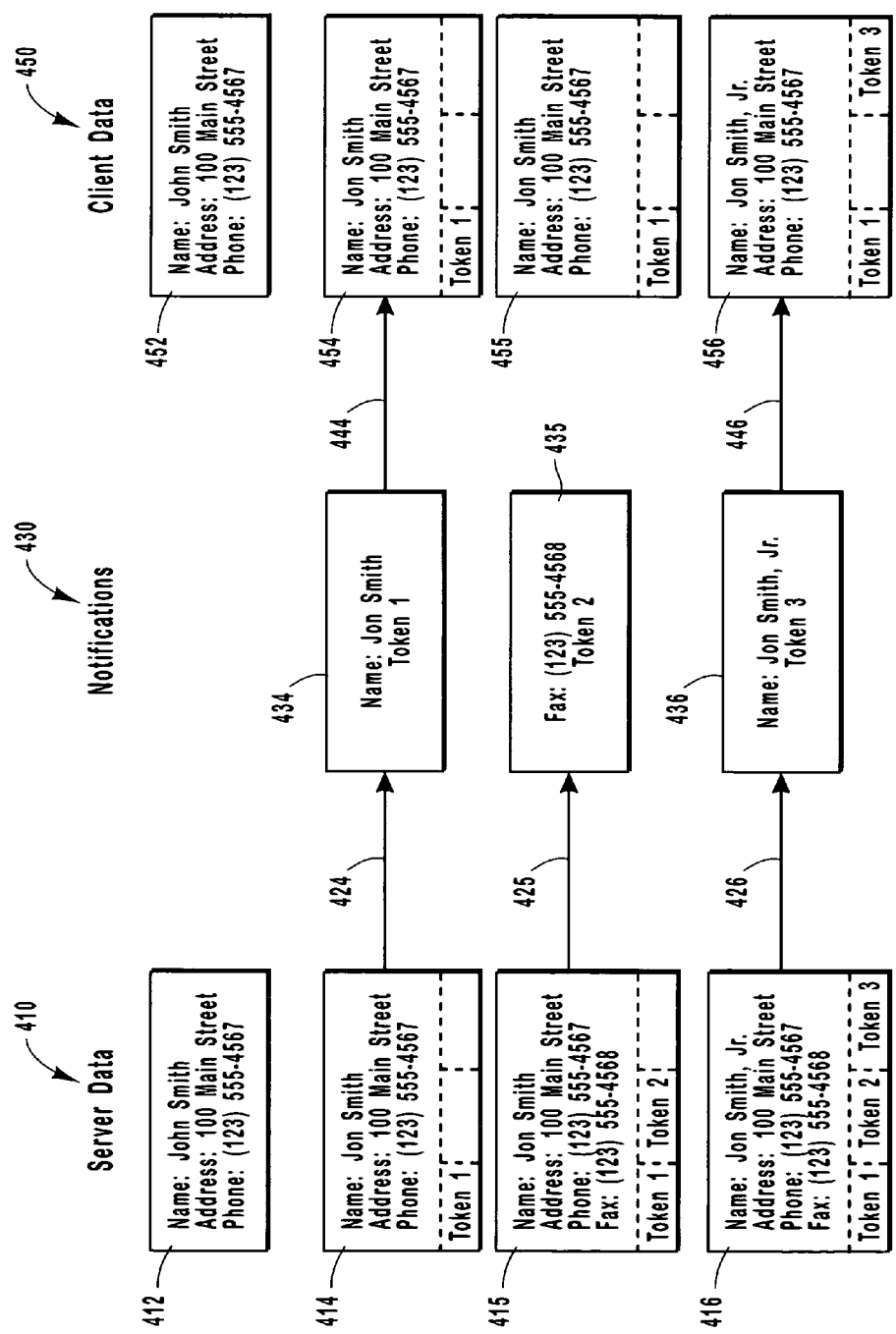
FIGS. 4A and 4B illustrate an example of the synchronization of a client copy of contact information with changes made to a server copy of the same information in accordance with the present invention.
Figure 4B:
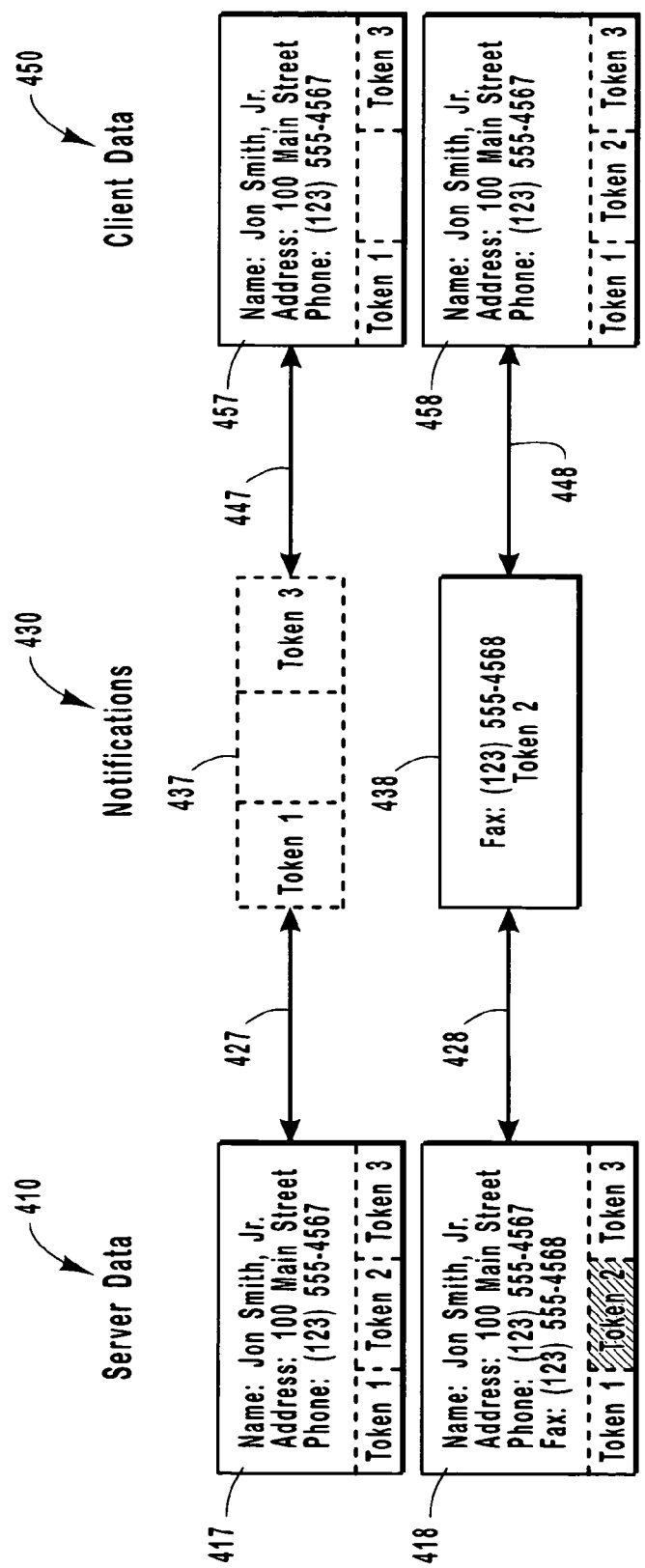

FIGS. 4A and 4B illustrate synchronizing a client copy 450 of contact information with changes made to a server copy 410 of the same information using notifications 430. Initially, as shown in FIG. 4A, server data 412 and client data 452 contain the same data. Server data 414 reflects changing the contact's first name from "John" to "Jon." Token 1 is generated to identify the change. Notification 434 includes the name change and corresponding token. Upon receiving notification 434, client data 454 reflects the name change and stores the token. Arrows 424 and 444 indicate that notification 434 is communicated in one direction, possibly over an unreliable communication channel.

A fax number and its change identifier, Token 2, have been added to server data 415. Notification 435 contains the new fax number and associated token. As above, communication between the server and client occurs in one direction (arrow 425). In this instance, however, client data 455 does not receive notification 435. Therefore, neither the new fax number nor its corresponding token are reflected in client data 455.

Server data 416 show a final change. "Jr." is added to the name field and Token 3 has been generated to identify the change. Notification 436 includes the name change and token. After receiving notification 436, client data 456 reflects the name change and stores Token 3. Here again, arrows 426 and 446 indicate that communication occurs from the server to the client without acknowledgement or confirmation.

Turning now to FIG. 4B, the server has received a synchronization request from the client. Client data 457 returns to server data 417 all of the tokens received by the client, including a token for use as a start point that is based on the previous synchronization. Reference 437 includes Token 1 and Token 3. Token 1 is the starting point for determining which tokens have been received. Note that Token 2 is not returned because the client never received notification 435. Reference 437 appears as a dashed box to indicate that it is a return of received tokens rather than a notification. Arrows 427 and 447 show that returning tokens uses two-way communication between client and server, possibly implemented as a reliable communication channel. It should be noted that the present invention does not necessarily impose any particular requirement on how the tokens are returned to the server (e.g., as a collection, notification, or as individual tokens).

Beginning with the starting token, returned tokens are compared with the sent tokens to identify any tokens that may be missing. Other than identifying a starting point for the token comparison, the present invention does not impose any particular requirements on the starting token. Server data 418 shows that Token 2 was not received back from the client. In one embodiment, the server provides a list of missing tokens back to the client so that the client may request the changes that it has not received. In response to a request for Token 2, notification 438 is generated to resend the missing change and associated token. Alternatively, the server could simply send notification 438 (or the corresponding change itself) rather than sending a list of missing tokens and waiting for the client to request the corresponding changes.

It is possible to send the missing change to the client as notification 438 rather than only the change itself, but the invention does not necessarily impose any particular structure for resending changes to the client. Nevertheless, by sending notification 438, if the resending process is interrupted, it can be resumed without any special processing. The client simply can proceed at a later time by returning all of the tokens it has received. Any notifications received during the prior resending provide a corresponding token. Those notifications not received due to the interruption do not provide a token. The tokens that are still missing due to the interruption are identified and the corresponding notifications are sent to the client.

As part of synchronizing, the server sends to the client a collection of tokens representing the current state of the data stored by client. After receiving the collection, the client discards the notifications received prior to the synchronization and begins receiving new notifications that identify new changes to the contact information. At a subsequent synchronization, the client provides only the collection and tokens from the new notifications back to the server.

Thus, the principles of the present invention allow for data to be synchronized between a message server and a message client even if the server and the client represent the same data in a different manner. Furthermore, as mentioned above, when the server and client represent the same data in a different manner, it is difficult to determine whether the different data structures do indeed represent the same data by resorting to a field-by-field comparison. Thus, in conventional systems, the user is often prompted to intervene when the server could not make the determination. The present invention eliminates this requirement thereby making synchronization much more user friendly, especially when data is represented differently by the server and client.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product for use, in an electronic messaging environment that includes a message server and one or more message clients, the computer program product for implementing a method for enabling synchronization of data stored at the one or more message clients with data stored at the message server, while accounting for one or more update notifications sent from the message server to the one or more message clients and while accounting for any differences in how the message server and the one or more message clients store data, the computer-program product comprising one or more physical storage media having stored thereon computer-executable instructions that, when executed by a processor, cause the message server to perform the method, including the following:
   a step for providing, over an unreliable communication channel, a plurality of notifications to the one or more message clients without requesting or receiving acknowledgement of receipt of the notifications by the one or more message clients, the plurality of notifications including (i) a plurality of changes to the data stored at the message server, and (ii) a plurality of tokens identifying each of the plurality of changes;
   a step for determining whether or not the one or more message clients are missing any of the plurality of notifications based on whether or not the one or more message clients provide back each of the plurality of tokens identifying each of the plurality of changes;
   an act of sending a list identifying missing notifications to the one or more corresponding message clients;
   an act of receiving a request from the one or more message clients to resend the one or more missing notifications; and
   an act of resending the one or more missing notifications to the one or more requesting message clients.

2. A computer program product as recited in claim 1, wherein the unreliable communication channel comprises a wireless communication channel.

3. A computer program product as recited in claim 1, further comprising a step for providing a collection object to the one or more message clients, the collection object representing a state of the data stored at the one or more message clients.

4. A computer program product as recited in claim 1, wherein the step for providing any change associated with a missing notification further comprises a step for providing any token associated with a missing notification.

5. A computer program product as recited in claim 1, further comprising an act of compressing the plurality of tokens to produce tokens that are unique to each of the one or more message clients.

6. A computer program product as recited in claim 1, wherein the data stored at the message server includes at least one of contact data, calendar data, task data, and email data and wherein the one or more message clients comprise one of a portable personal computer, a cellular telephone, a pager, and a personal digital assistant.

7. A computer program product as recited in claim 1, wherein at least one change made in the message server data is divided into a first portion and a second portion, and at least one notification corresponds to the first portion, the method further comprising a step for providing the second portion to the one or more message clients in response to receiving a token associated with the first portion.

8. In an electronic messaging environment, a system for enabling synchronization of data, while accounting for one or more update notifications sent from a message server to one or more message clients and while accounting for any differences in how the message server and the one or more message clients store data, the system comprising:
   a message server storing data;
   one or more message clients storing data;
   an unreliable communication channel at least intermittently connecting the message server and the one or more message clients; and
   processor means at the message server for performing the following:
      a step for providing, over the unreliable communication channel, a plurality of notifications to the one or more message clients without requesting or receiving acknowledgement of receipt of the notifications by the one or more message clients, the plurality of notifications including (i) a plurality of changes to the data stored at the message server, and (ii) a plurality of tokens identifying each of the plurality of changes;
      a step for determining whether or not the one or more message clients are missing any of the plurality of notifications based on whether or not the one or more message clients provide back each of the plurality of tokens identifying each of the plurality of changes;
      an act of sending a list identifying missing notifications to the one or more corresponding message clients;
      an act of receiving a request from the one or more message clients to resend the one or more missing notifications; and
      an act of resending the one or more missing notifications to the one or more requesting message clients.

9. A system as recited in claim 8, wherein the unreliable communication channel comprises a wireless communication channel.

10. A system as recited in claim 8, wherein the processor means at the message server further performs a step for providing a collection object to the one or more message clients, the collection object representing a state of the data stored at the one or more message clients.

11. A system as recited in claim 8, wherein the step for providing any change associated with a missing notification further comprises a step for providing any token associated with a missing notification.

12. A system as recited in claim 8, wherein the processor means at the message server further performs an act of compressing the plurality of tokens to produce tokens that are unique to each of the one or more message clients.

13. A system as recited in claim 8, wherein the data stored at the message server includes at least one of contact data, calendar data, task data, and email data and wherein the one or more message clients comprise one of a portable personal computer, a cellular telephone, a pager, and a personal digital assistant.

14. A system as recited in claim 8, wherein at least one change made in the message server data is divided into a first portion and a second portion, and at least one notification corresponds to the first portion, the method further comprising a step for providing the second portion to the one or more message clients in response to receiving a token associated with the first portion.

* * * * *